US011013230B2

(12) United States Patent
Schaefer

(10) Patent No.: US 11,013,230 B2
(45) Date of Patent: May 25, 2021

(54) BREAK AWAY/TEAR AWAY CRYOPRESERVATION VIAL AND METHODS FOR MANUFACTURING AND USING SAME

(71) Applicant: CORNING INCORPORATED, Corning, NY (US)

(72) Inventor: Michael Kurt Schaefer, Gorham, ME (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 16/832,280

(22) Filed: Mar. 27, 2020

(65) Prior Publication Data

US 2020/0221691 A1 Jul. 16, 2020

Related U.S. Application Data

(62) Division of application No. 15/380,249, filed on Dec. 15, 2016, now Pat. No. 10,638,748.

(Continued)

(51) Int. Cl.
*B29C 45/00* (2006.01)
*A01N 1/02* (2006.01)
(Continued)

(52) U.S. Cl.
CPC ......... *A01N 1/0284* (2013.01); *A01N 1/0263* (2013.01); *B29C 45/0081* (2013.01); *B29K 2023/12* (2013.01); *B29L 2031/712* (2013.01)

(58) Field of Classification Search
CPC ....... A01N 1/0263; A01N 1/0284; B01L 3/50; B01L 3/508; B01L 3/52; B01L 2300/043;
(Continued)

(56) References Cited

U.S. PATENT DOCUMENTS 2,157,476 A 5/1939 Brodesser
2,434,505 A 1/1948 Miller
(Continued)

FOREIGN PATENT DOCUMENTS

AU 2010241296 B2 9/2014
CA 2314658 A1 1/2002
(Continued)

OTHER PUBLICATIONS

Corning 1.2mL External Threaded Polypropylene Cryogenic Vial, Self-Standing With Conical Bottom (Product #430658) Corning Life Sciences Catalong, Jan. 24, 2015, https://catalog2.corning.com/LifeSciences/en-US/Shopping/ProductDetails.aspx?productid=430658.

*Primary Examiner* — Jill A Warden
*Assistant Examiner* — Dwayne K Handy
(74) *Attorney, Agent, or Firm* — Annie J. Kock

(57) ABSTRACT

A vial is described herein that comprises a tubular body which comprises an opened end, a closed end, and a cavity, wherein the opened end is located at one end of the tubular body and the closed end is located at an opposing end of the tubular body. The tubular body further comprises a tear line located therein, wherein the tear line extends across at least a portion of one side of the tubular body, across the closed end, and across at least a portion of another side of the tubular body. In addition, the tubular body further comprises two flanges extending from the closed end, wherein the two flanges are configured to separate from one another outwardly from the tubular body and apply a force to break-open at least a portion of the tear line to open at least the closed end of the tubular body.

6 Claims, 14 Drawing Sheets

Related U.S. Application Data

(60) Provisional application No. 62/270,961, filed on Dec. 22, 2015.

(51) Int. Cl.
*B29K 23/00* (2006.01)
*B29L 31/00* (2006.01)

(58) Field of Classification Search
CPC ......... B01L 2300/0832; B29C 45/0081; B29L 2031/712; B29L 2031/7148; B29L 2031/7158
See application file for complete search history.

(56) References Cited

U.S. PATENT DOCUMENTS

| | | |
|---|---|---|
| 2,992,501 A | 7/1961 | Douglas |
| 3,139,208 A | 6/1964 | Irwin et al. |
| 3,166,221 A | 1/1965 | Helmuth |
| 3,419,179 A | 12/1968 | Deuschle et al. |
| 3,483,908 A | 12/1969 | Donovan |
| 3,491,907 A | 1/1970 | Eelkema |
| 3,727,802 A | 4/1973 | Schnurmacher |
| 3,810,503 A | 5/1974 | Lewis, Jr. et al. |
| 3,827,602 A | 8/1974 | Nicholls |
| 4,018,222 A | 4/1977 | McAleer et al. |
| 4,251,995 A | 2/1981 | Pert et al. |
| 4,560,535 A | 12/1985 | Bouchee |
| 4,639,250 A | 1/1987 | Rycroft |
| 4,880,125 A | 11/1989 | LeBeau |
| 4,972,969 A | 11/1990 | Randklev |
| 5,033,631 A | 7/1991 | Nightingale |
| 5,699,935 A | 12/1997 | Stahley |
| 5,711,446 A | 1/1998 | Jeffs et al. |
| 5,826,751 A | 10/1998 | Stahley et al. |
| 5,873,490 A | 2/1999 | Walpole |
| 6,315,171 B1 | 11/2001 | Piscopo et al. |
| 6,337,205 B1 | 1/2002 | Wisniewski |
| 6,379,342 B1 | 4/2002 | Levinson |
| 6,446,860 B1 | 9/2002 | Robichaud |
| 8,092,878 B2 | 1/2012 | Miller et al. |
| 8,168,138 B2 | 5/2012 | Che et al. |
| 8,222,027 B2 | 7/2012 | Woods et al. |
| 8,550,273 B2 | 10/2013 | Levin et al. |
| 8,834,014 B2 | 9/2014 | Summons et al. |
| 2002/0056716 A1 | 5/2002 | Banhagel |
| 2002/0197656 A1 | 12/2002 | Li et al. |
| 2004/0097862 A1 | 5/2004 | Lampeter et al. |
| 2004/0217080 A1 | 11/2004 | Renz |
| 2005/0124965 A1 | 6/2005 | Haywood |
| 2006/0019233 A1 | 1/2006 | Yaghmour |
| 2008/0118686 A1 | 5/2008 | Glasgow et al. |
| 2009/0194904 A1 | 8/2009 | Logel et al. |
| 2009/0236258 A1 | 9/2009 | Connell |
| 2009/0255938 A1 | 10/2009 | Fuja |
| 2009/0305224 A1 | 12/2009 | He et al. |
| 2010/0196873 A1 | 8/2010 | Woods |
| 2010/0241074 A1 | 9/2010 | Bivin et al. |
| 2010/0316446 A1 | 12/2010 | Runyon |
| 2011/0008908 A1 | 1/2011 | Biesbrouck |
| 2011/0143452 A1 | 6/2011 | Che et al. |
| 2011/0174814 A1 | 7/2011 | Ortiz et al. |
| 2011/0250632 A1 | 10/2011 | Tatnell et al. |
| 2011/0295212 A1 | 12/2011 | Greter et al. |
| 2012/0027895 A1 | 2/2012 | Bach |
| 2012/0029471 A1 | 2/2012 | Lee et al. |
| 2012/0258214 A1 | 10/2012 | Sagel |
| 2013/0065301 A1 | 3/2013 | Woods et al. |
| 2014/0079898 A1 | 3/2014 | Kaushik et al. |
| 2014/0138406 A1 | 5/2014 | Sanfilippo et al. |
| 2014/0157798 A1 | 6/2014 | Jimenez-Rios et al. |
| 2014/0158695 A1 | 6/2014 | Jimenez-Rios |
| 2014/0224808 A1 | 8/2014 | Brisard |
| 2015/0048085 A1 | 2/2015 | Brown et al. |
| 2016/0363362 A1 | 12/2016 | Chen et al. |
| 2017/0172140 A1 | 6/2017 | Schaefer |
| 2018/0242572 A1 | 8/2018 | Coddaire et al. |
| 2018/0242573 A1 | 8/2018 | Lacey et al. |

FOREIGN PATENT DOCUMENTS

| | | |
|---|---|---|
| CH | 240683 A | 1/1946 |
| CN | 2892068 Y | 4/2007 |
| CN | 201284338 Y | 8/2009 |
| CN | 201322489 Y | 10/2009 |
| CN | 102379278 A | 3/2012 |
| CN | 202522460 U | 11/2012 |
| CN | 203290150 U | 11/2013 |
| CN | 203519403 U | 4/2014 |
| CN | 204599132 U | 9/2015 |
| CN | 104986426 A | 10/2015 |
| EP | 2191899 A1 | 6/2010 |
| EP | 2364928 A1 | 9/2011 |
| EP | 2442857 A1 | 4/2012 |
| EP | 2575442 A1 | 4/2013 |
| FR | 1411842 A | 9/1965 |
| FR | 2846128 A1 | 4/2004 |
| JP | 07-333219 A | 12/1995 |
| JP | 10-309185 A | 11/1998 |
| JP | 2000516137 A | 12/2000 |
| JP | 2001106262 A | 4/2001 |
| JP | 2003267463 A | 9/2003 |
| JP | 2004018504 A | 1/2004 |
| JP | 2006516398 A | 7/2006 |
| JP | 2008-507563 A | 3/2008 |
| JP | 2010-518393 A | 5/2010 |
| JP | 04848755 B2 | 12/2011 |
| JP | 04876922 B2 | 2/2012 |
| JP | 2012020763 A | 2/2012 |
| JP | 2012-219017 A | 11/2012 |
| JP | 2014-190904 A | 10/2014 |
| WO | 1999001770 A1 | 1/1999 |
| WO | 2000030703 A1 | 6/2000 |
| WO | 01/43869 A2 | 6/2001 |
| WO | 0228733 A1 | 4/2002 |
| WO | 2005022996 A1 | 3/2005 |
| WO | 2006012613 A1 | 2/2006 |
| WO | 2006059626 A1 | 6/2006 |
| WO | 2007103917 A2 | 9/2007 |
| WO | 2008/097091 A1 | 8/2008 |
| WO | 2010/145786 A1 | 12/2010 |
| WO | 2011146998 A1 | 12/2011 |
| WO | 2013171483 A1 | 11/2013 |
| WO | 2014/095840 A1 | 6/2014 |
| WO | 2014088859 A1 | 6/2014 |
| WO | 2015/023560 A2 | 2/2015 |
| WO | 2016040063 A1 | 3/2016 |
| WO | 2017/087176 A1 | 5/2017 |
| WO | 2017/087178 A1 | 5/2017 |

BREAK AWAY/TEAR AWAY CRYOPRESERVATION VIAL AND METHODS FOR MANUFACTURING AND USING SAME

This application is a divisional of U.S. patent application Ser. No. 15/380,249 filed on Dec. 15, 2016, which claims the benefit of priority under 35 U.S.C. § 119 of U.S. Provisional Application Ser. No. 62/270,961 filed on Dec. 22, 2015, the contents of which are relied upon and incorporated herein by reference in their entirety.

RELATED APPLICATIONS

This application is related to the following co-assigned applications: (1) U.S. patent application Ser. No. 14/081,326, filed Nov. 15, 2013, and entitled "Vessels and Methods for Cryopreservation"; (2) U.S. Provisional Application No. 62/255,627, filed Nov. 16, 2015, and entitled "Cryogenic Vial Assemblies"; and (3) U.S. Provisional Application No. 62/255,633, filed Nov. 16, 2015, and entitled "Cryogenic Vial Assemblies". The entire contents of these documents are hereby incorporated herein by reference for all purposes.

TECHNICAL FIELD

The present disclosure generally relates to the biological field and, in particular, to a vial (e.g., cryopreservation vial) and methods for using and manufacturing the vial (e.g., cryopreservation vial).

BACKGROUND

Biological samples such as cells and tissues are often cryopreserved to extend their viability and usefulness for a variety of applications. For example, the cryopreservation process can involve placing a biological sample into an aqueous solution containing electrolytes and/or cryoprotectants and lowering the temperature of the solution to below its freezing point. Biological samples are often stored in vials which can be sealed and frozen, e.g., by immersion in liquid nitrogen. It is important to maintain the integrity of the biological samples during the filling, storage, and retrieval stages, as contamination can render a biological sample useless for scientific research or other applications.

Vial leakage, which can be caused by a failure of the seal between the vial and the cap, can be a contributing factor to sample contamination. Sample contamination can also occur during thawing of the sample prior to its removal from the vial. For instance, cryopreservation vials are often placed in a warm bath or a heated block to partially or completely defrost the sample for ease of removal. However, the samples can become contaminated or lose part of their viability during this process due to liquid immersion and/or elevated temperatures which can for instance cause ice crystals to break-up and puncture cells. The sample may also become overstressed due to excessive heating at the wall surface of the vial which can further damage the sample.

Removal of samples in the frozen state without thawing may reduce the risk of sample contamination and/or damage. However, it can be difficult to remove the frozen sample from the vial due to adhesion of the sample to the vial wall surface. Further, it can be difficult to grip and/or exert a force on the frozen sample to remove the frozen sample from the vial. These problems and other problems which are associated with the removal of the sample in the frozen state from the vial are addressed by present disclosure.

SUMMARY

A vial, a method for using the vial, and methods for manufacturing the vial are described in the independent claims of the present application. Advantageous embodiments of the vial, the method of using the vial, and the methods of manufacturing the vial are described in the dependent claims.

In one aspect, the present disclosure provides a vial which comprises a tubular body comprising an opened end, a closed end, and a cavity, wherein the opened end is located at one end of the tubular body and the closed end is located at an opposing end of the tubular body. The tubular body further comprises a tear line located therein, wherein the tear line extends across at least a portion of one side of the tubular body, across the closed end, and across at least a portion of another side of the tubular body. In addition, the tubular body comprises two flanges extending from the closed end, wherein the two flanges are configured to separate from one another outwardly from the tubular body and apply a force to break apart at least a portion of the tear line and open at least the closed end of the tubular body.

In another aspect, the present disclosure provides a method for using a vial. The method comprising the steps of: (a) introducing a liquid sample into the vial, wherein the vial comprises: (i) a tubular body comprising an opened end, a closed end, and a cavity, wherein the opened end is located at one end of the tubular body and the closed end is located at an opposing end of the tubular body; (ii) the tubular body further comprises a tear line located therein, wherein the tear line extends across at least a portion of one side of the tubular body, across the closed end, and across at least a portion of another side of the tubular body; and (iii) the tubular body further comprises two flanges extending from the closed end; (b) engaging the opened end of the tubular body with a cap to seal the vial; (c) freezing the liquid sample within the sealed vial; (d) separating the two flanges from one another outwardly from the tubular body to apply a force to break apart at least a portion of the tear line to open at least the closed end of the tubular body; and (e) ejecting the frozen liquid sample from the now opened closed end of the tubular body.

In yet another aspect, the present disclosure provides a method for manufacturing a vial. The method comprising the steps of: (a) providing a mold comprising a cavity section therein that is a negative of a shape of the vial; (b) injecting a melted material into the cavity section of the mold; (c) cooling the material within the cavity section of the mold; and (d) removing the cooled material from the mold, wherein the cooled material is the vial which has (i) a tubular body comprising an opened end, a closed end, and a cavity, wherein the opened end is located at one end of the tubular body and the closed end is located at an opposing end of the tubular body; (ii) the tubular body further comprises a tear line located therein, wherein the tear line extends across at least a portion of one side of the tubular body, across the closed end, and across at least a portion of another side of the tubular body; and (iii) the tubular body further comprises two flanges extending from the closed end.

In still yet another aspect, the present disclosure provides a method for manufacturing a vial. The method comprising the steps of: (a) providing a vial which comprises: (i) a tubular body comprising an opened end, a closed end, and a vial, wherein the opened end is located at one end of the tubular body and the closed end is located at an opposing end of the tubular body; (ii) the tubular body further comprises two flanges extending from the closed end; and (b) creating a tear line within the tubular body, wherein the tear line extends across at least a portion of one side of the tubular body, across the closed end, and across at least a portion of another side of the tubular body.

Additional aspects of the disclosure will be set forth, in part, in the detailed description, figures and any claims which follow, and in part will be derived from the detailed description, or can be learned by practice of the disclosure. It is to be understood that both the foregoing general description and the following detailed description are exemplary and explanatory only and are not restrictive of the disclosure as disclosed.

BRIEF DESCRIPTION OF THE DRAWINGS

A more complete understanding of the present disclosure may be had by reference to the following detailed description when taken in conjunction with the accompanying drawings wherein.

DETAILED DESCRIPTION

Cryopreservation Vial

Figure 1A:
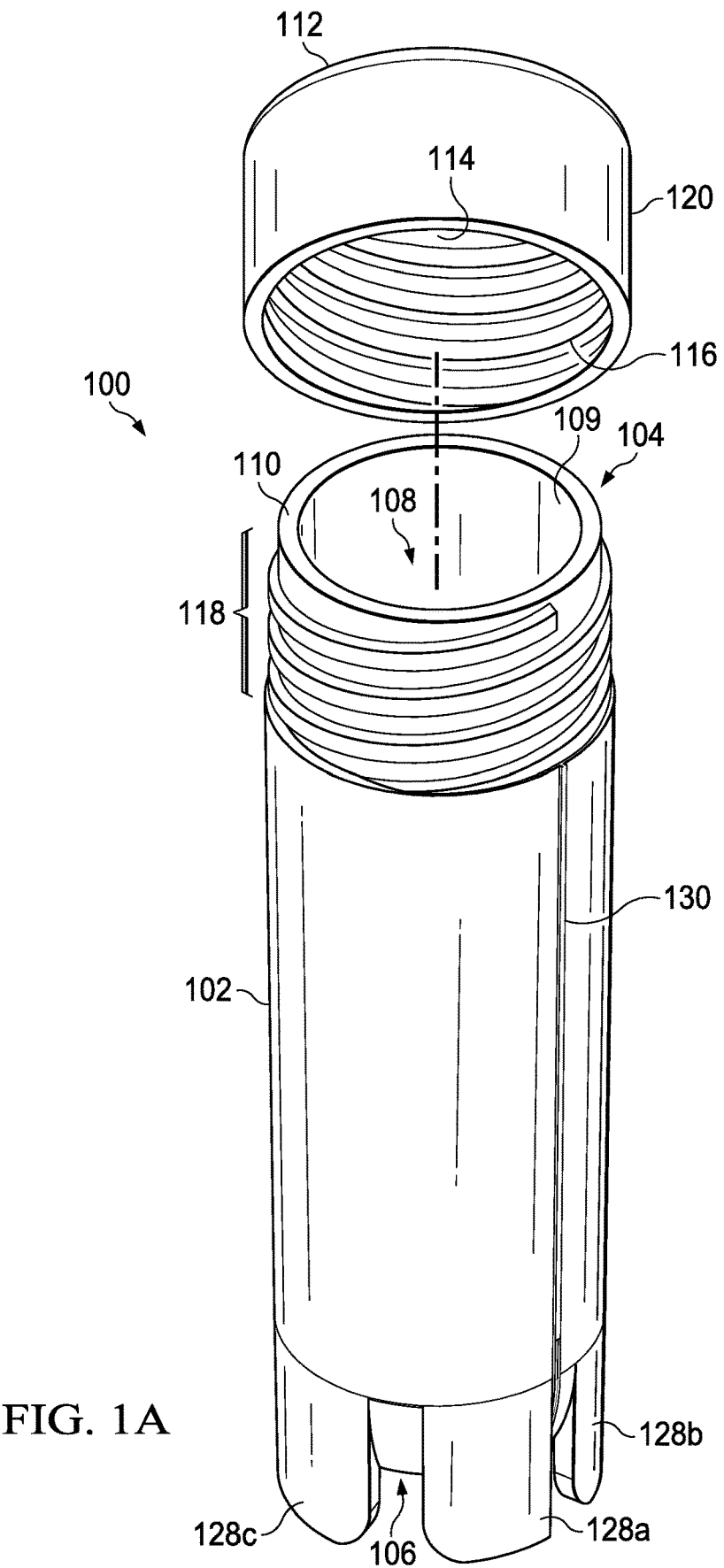
FIGS. 1A-1D are two perspective views and two cross-sectional views of a vial (e.g., cryopreservation vial) according to an embodiment of the present disclosure.

Disclosed herein is a vial comprising a tubular body which comprises an opened end, a closed end, and a cavity, wherein the opened end is located at one end of the tubular body and the closed end is located at an opposing end of the tubular body. The tubular body further comprises a tear line located therein, wherein the tear line extends across at least a portion of one side of the tubular body, across the closed end, and across at least a portion of another side of the tubular body. In addition, the tubular body comprises two flanges extending from the closed end, wherein the two flanges are configured to separate from one another outwardly from the tubular body and apply a force to break apart at least a portion of the tear line and open at least the closed end of the tubular body.

Embodiments of the disclosure will be discussed with reference to FIGS. 1A-1D, which illustrate various aspects of a vial according to non-limiting embodiments of the disclosure. The following general description is intended to provide an overview of the vial and various aspects will be more specifically discussed throughout the disclosure with reference to the non-limiting embodiments, these embodiments being interchangeable with one another within the context of the disclosure. Although the vial described herein is done with reference to a cryopreservation vial (cryogenic vial) it should be appreciated that the vial can be configured for use in other fields other than the cryogenics field such as (for example):—cell culture, drug discovery, genomics and life science applications. Basically, the vial is configured to store a frozen biological sample therein and is further configured to enable the removal of the frozen biological sample therefrom without having to thaw the biological sample which reduces the risk of contamination and/or damage to the biological sample.

Referring to FIGS. 1A-1D, there are two perspective views and two cross-sectional views of a vial 100 configured in accordance with an embodiment of the present disclosure. The vial 100 can, in non-limiting embodiments, comprise a tubular body 102 having an opened end 104, a closed end 106, and a cavity 108. The cavity 108 can comprise an internal surface 109 that extends from an opening in the opened end 104 to the closed end 106. The opened end 104 can comprise a lip 110 defining the opening (e.g., circular opening) to be sealed by a cap 112 (see FIG. 1A). The lip 110 can engage, in some embodiments, a bottom surface 114 of the cap 112, such that in the closed position the bottom surface 114 abuts the lip 110. Optionally, a seal or sealing material (not shown) can be provided between the lip 110 and the bottom surface 114 to enhance the integrity of the seal. Suitable sealing materials can include, for example, thermoplastic and thermoset elastomers, such as silicon-based polymers (e.g., polydimethylsiloxane) or multi-block elastomer alloys (e.g., Versaflex™ products from PolyOne, such as CL2250 or HC MT222), to name a few. In some embodiments, a sealing ring can be placed around the lip 110.

The cap 112 is configured to mate or couple with the tubular body 102 so as to rest atop the lip 110 and seal (hermetically seal) or otherwise enclose the opened end 104. In one embodiment, the cap 112 can comprise a threaded internal surface 116 capable of mating or coupling with a threaded external surface 118 of the tubular body 102. For example, at least a portion of the threaded external surface 118 of the tubular body 102 can comprise threading, which can match at least a portion of the threaded internal surface 116 of the cap 100. As used herein, the terms "threaded" and "threading" and variations thereof are intended to denote alternating raised and recessed sections generally defining an upward or downward spiral motion, e.g., such that the cap 112 can be screwed or rotated on and off the opened end 104 of the tubular body 102.

In one embodiment, all or a portion of an outer surface 120 of the cap 112 may be textured to improve gripping ease when handling, closing, and/or opening the vial 100. In certain embodiments, the outer surface 120 of the cap 112 can be ribbed. According to additional embodiments, portions of the outer surface 120 of the cap 112 can be textured, e.g., have one or more regions of a textured surface, such as strips or grips for finger placement.

Figure 1B:
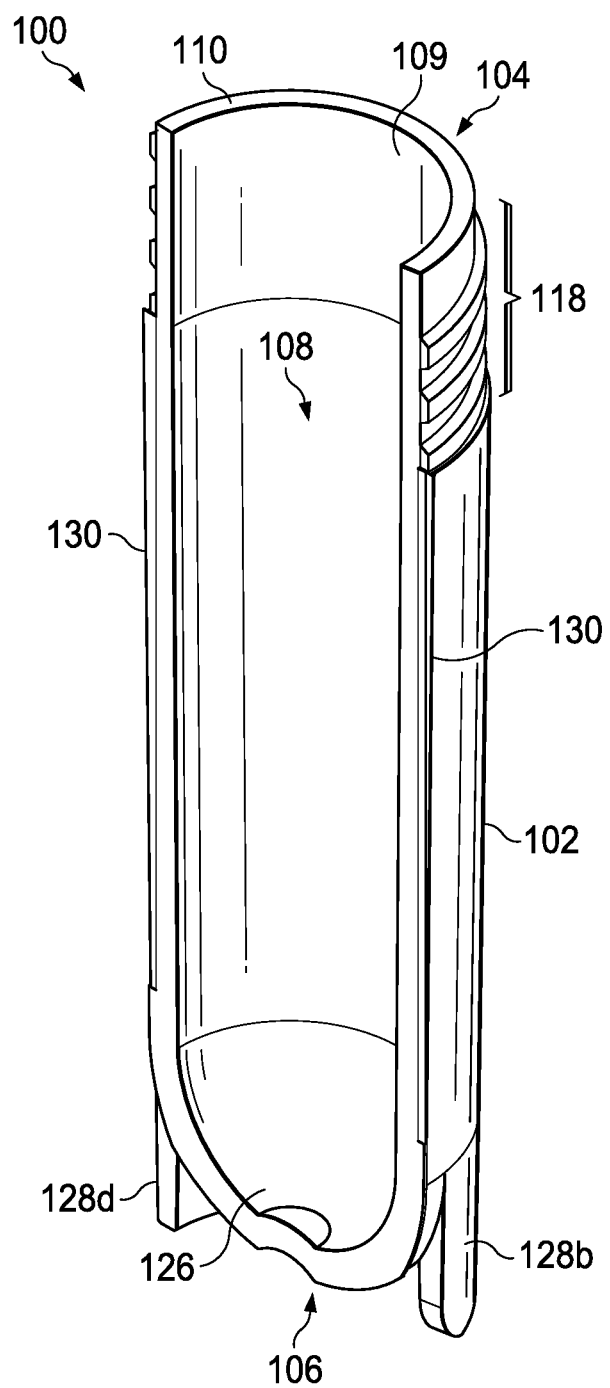
Figure 1C:
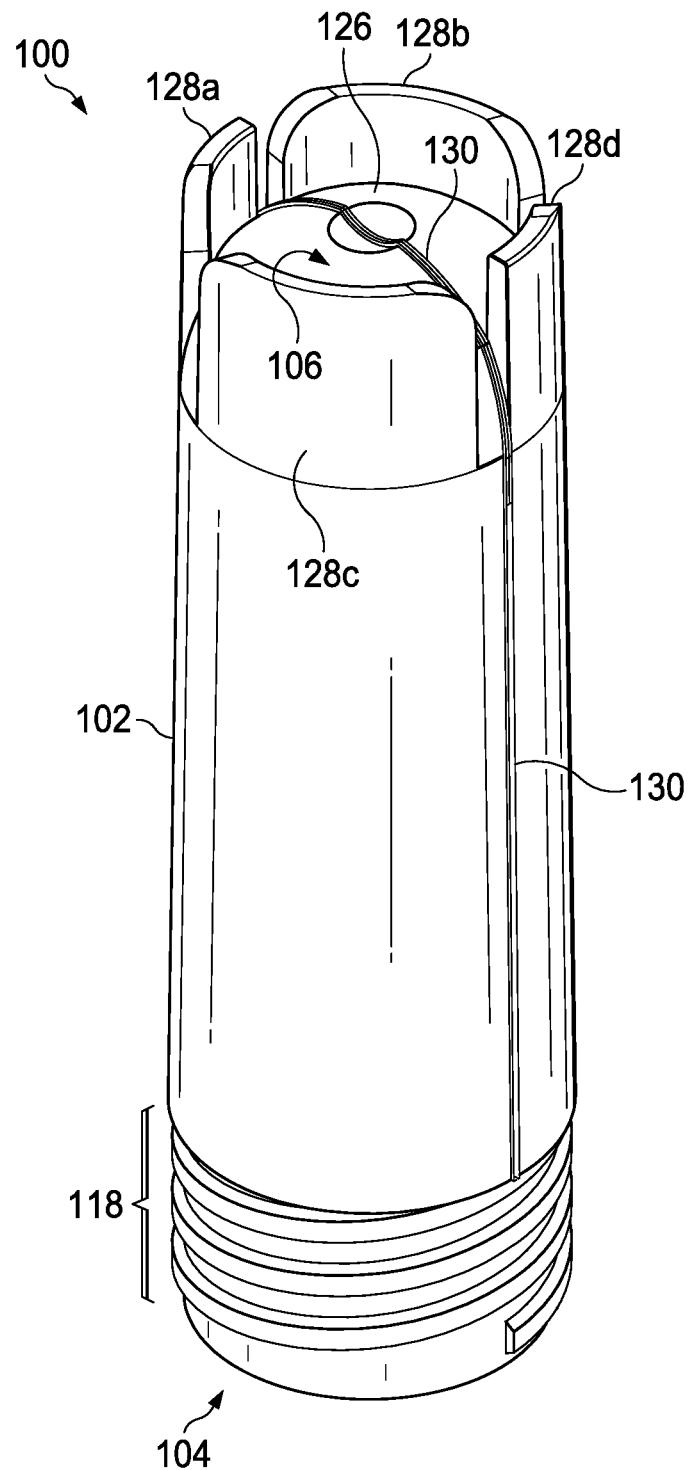
Figure 1D:
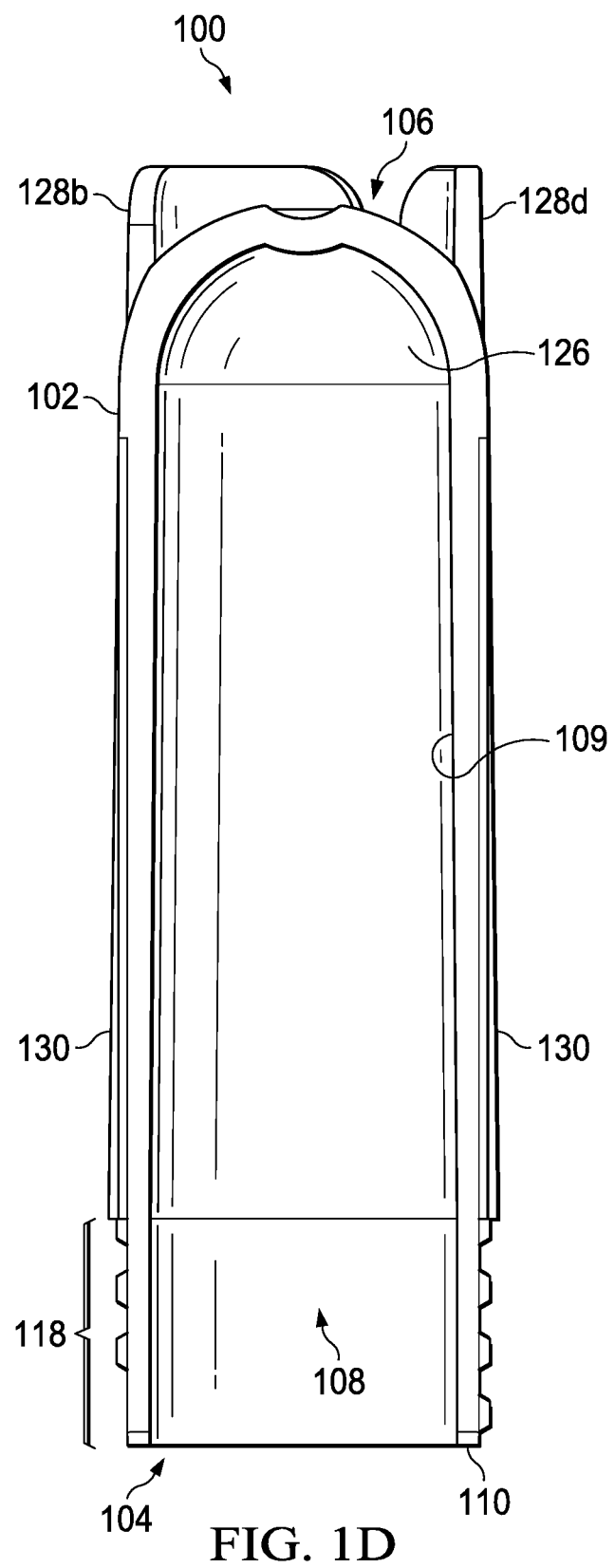

The closed end 106 of the tubular body 102 is clearly illustrated in FIGS. 1B-1D and will be discussed in more detail with reference to these images. As depicted, the closed end 106 can have a substantially rounded bottom 126, although other shapes are possible and envisioned as falling within the scope of the present disclosure. The closed end 106 can have substantially similar properties to the remainder of the tubular body 102, e.g., wall thickness, rigidity, etc . . . .

As demonstrated in FIGS. 1A-1D, the tubular body 102 further comprises a tear line 130 located therein, wherein the tear line 130 extends across at least a portion of one side of the tubular body 102, across the closed end 106, and across at least a portion of another side of the tubular body 102. In the illustrated example shown, the tear line 130 starts just below the threaded external surface 118 on one side of the tubular body 102 and extends across that side of the tubular body 102, across the closed end 106, and then across at least a portion of another side of the tubular body 102 up to the threaded external surface 118 of the tubular body 102. In another embodiment, the tear line 130 could extend from the threaded external surface 118 (threaded portion 118) across the one side of the tubular body 102, across the closed end 106, and across the another side of the tubular body 102 and into the threaded external surface 118 (threaded portion 118) of the tubular body 102. It should be appreciated that the tear line 130 can extend across the tubular body 102 in any number of locations other than the shown location such that when the tear line 130 is broken apart this would enable or otherwise facilitate the removal of the frozen biological sample from the vial 100.

The tear line 130 is in at least some embodiments a molded imperfection or localized thin section within the tubular body 102 in which the breaking strength of the tear line 130 is greater than the strength (force) caused by the expansion of a frozen biological sample located within the vial 100 but lower than the strength required by the end user to break the tear-line 130. In some embodiments, the tear line 130 would be an intentional imperfection that is molded directly into the tubular body 102 and would function as a tear propagation site that would for example as shown vertically bisect the tubular body 102. If desired, the tubular body 102 can comprise multiple tear lines 130 such as two, three, four etc. . . . which are separate and distinct tear lines 130 that could be broken apart so as to further enable or otherwise facilitate the removal of the frozen biological sample from the vial 100.

The tear line 130 is essentially an intentional failure propagation point that permits the closed end 106 and if needed a portion of the sides of the tubular body 102 to be opened up such that the frozen biological sample located therein can be ejected from the now opened closed end 106 and deposited directly into an incubation vessel. This is a marked improvement over the traditional vials and removal methods which would include the thawing of the vial and the contents therein in a water bath, the centrifugation of the vial to separate toxic materials (e.g., Dimethyl Sulfoxide (DMSO)) out from the biological sample (this step is performed on a case by case basis), and the aspiration of the fluid biological sample from the vial into the incubation vessel. The traditional removal method is not desirable because the biological sample can become contaminated or lose part of their viability during this process due to liquid immersion and/or elevated temperatures which can for instance cause ice crystals to break-up and puncture cells. Further, the biological sample may also become overstressed due to the excessive heating at the wall surface of the vial which can further damage the biological sample. These problems are not present with the new break away/tear away vial 100 which enables the removal of a frozen biological sample.

According to embodiments, the tubular body 102 also has two flanges 128a, 128b, 128c and 128d (four shown in this example) extending from the closed end 106. In this example, flanges 128a and 128b (or flanges 128c and 128d) are configured to separate from one another outwardly from the tubular body 102 and apply a force to break apart at least a portion of the tear line 130 and open at least the closed end 106 of the tubular body 102. The flanges 128a, 128b, 128c and 128d can, in some embodiments, include a textured region, which can be raised for enhanced gripping by a user during use (e.g., finger grips) and/or for insertion into a storage rack or block, or recessed for fitting into standard tube racks.

Further features may be added to the tubular body 102 and/or the flanges 128a, 128b, 128c and 128d to enhance the ability to dislodge the frozen sample from the vial 100. In some embodiments, the wall of the vial 100 can be thinned in locations proximate the attachment points of the flange 128a, 128b, 128c and 128d to the tubular body 102. The thinning of the tubular body 102 in these locations may enhance the ability of the flanges 128a, 128b, 128c and 128d to hinge outwardly and apply a force to break apart at least a portion of the tear line 130 and open at least the closed end 106 of the tubular body 102. Further, the flanges 128a, 128b, 128c and 128d can also serve other functions as well other than breaking apart the tear line 130 such as, for example, providing a stand for the vial 100 and/or a means for storing the vial 100 within a rack or stand.

Additional optional features can be included in the vial 100 disclosed herein, for example, to improve the ease of handling, freezing, and/or sealing of the vial 100.

Method for Using the Cryopreservation Vial

Figure 2:
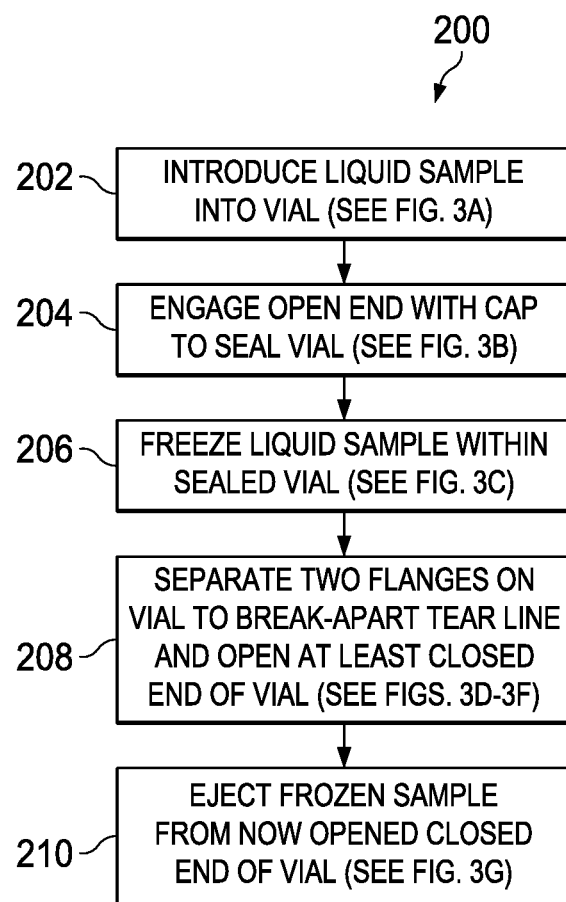
FIG. 2 is a flowchart illustrating the basic steps of a method for using the vial (e.g., cryopreservation vial) in accordance with an embodiment of the present disclosure.
Figure 3A:
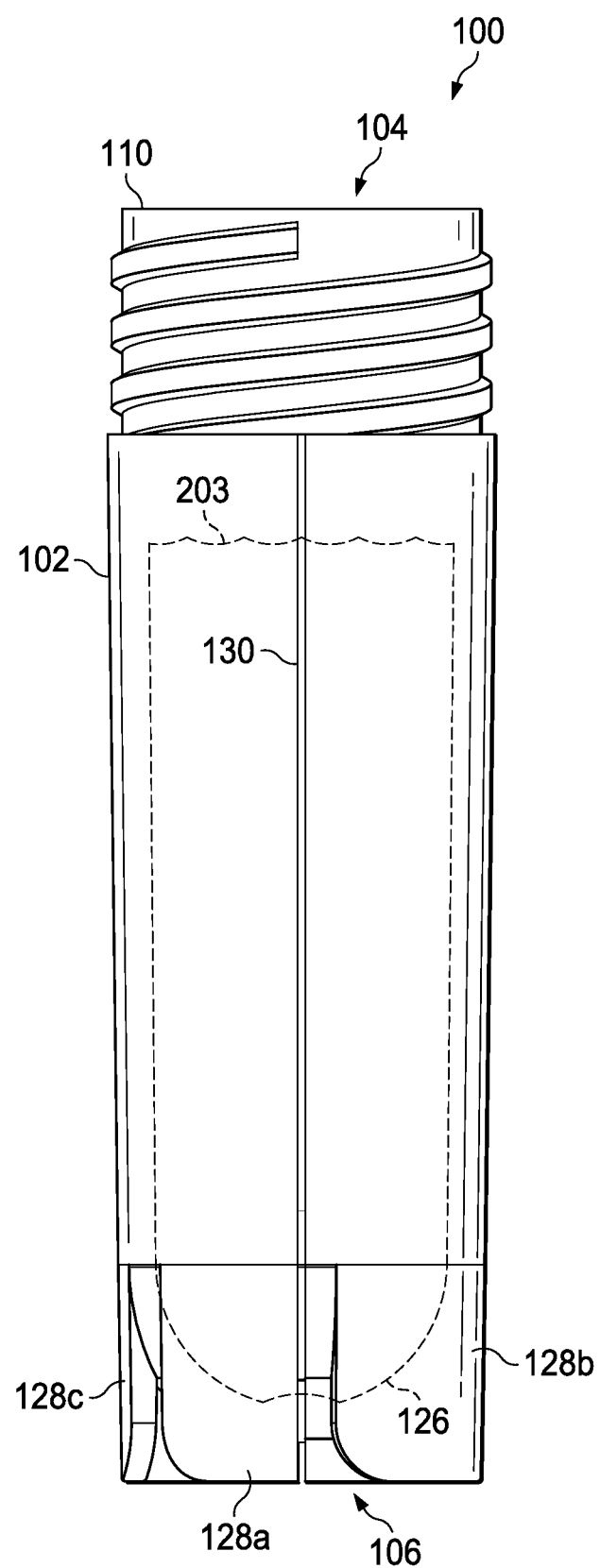
FIGS. 3A-3G illustrate the vial (e.g., cryopreservation vial) during the different steps of the method shown in FIG. 2 in accordance with an embodiment of the present disclosure.

Referring to FIG. 2, there is a flowchart illustrating the basic steps of a method 200 for using the vial 100 in accordance with an embodiment of the present disclosure. Beginning at step 202, a liquid sample 203 is introduced into the cavity 108 of the vial 100. According to various embodiments, the liquid sample 203, e.g. comprising a biological sample such as cells or tissues, can be introduced into the cavity 108 of the vial 100 (see FIGS. 1A-1D). For instance, a predetermined amount of the liquid sample 203 can be poured into the opened end 104 of the tubular body 102. FIG. 3A illustrates an exemplary vial 100 that contains the liquid sample 203 after step 202.

Figure 3B:
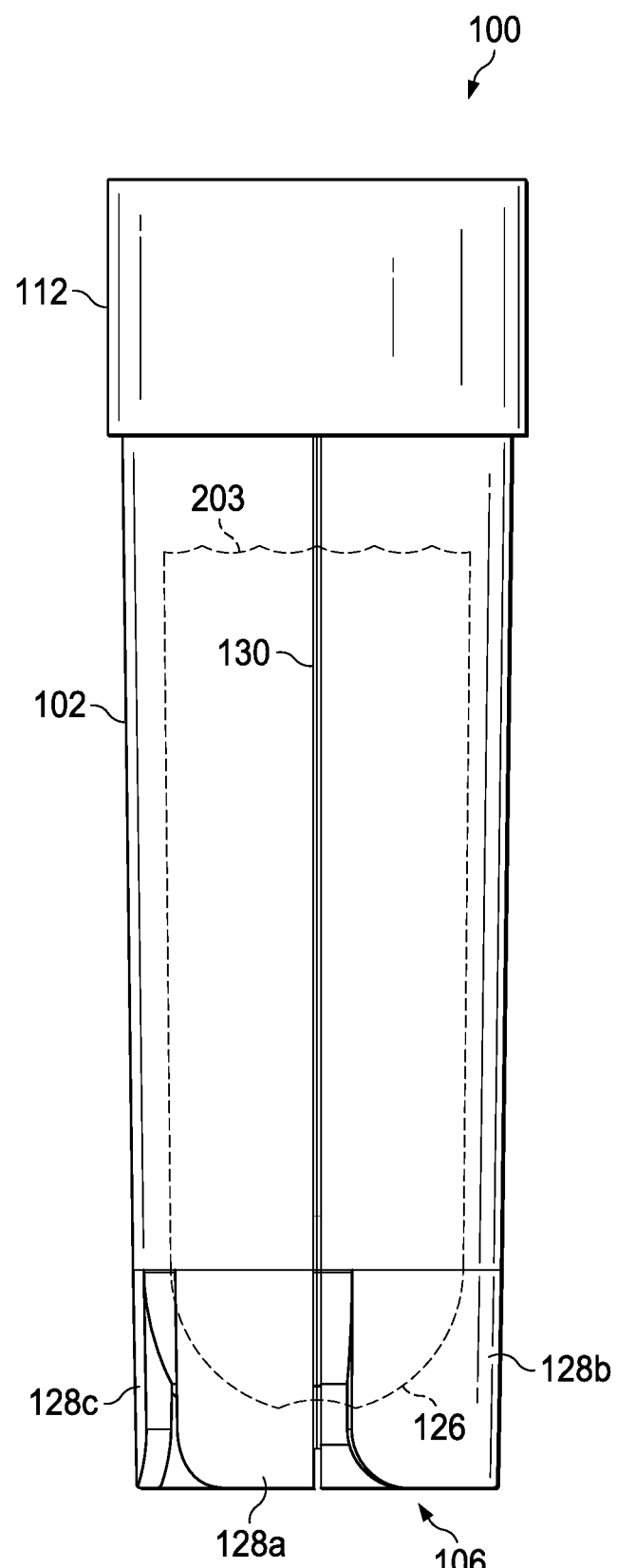

At step 204, the opened end 104 of the tubular body 102 is engaged with the cap 112 to seal the vial 110. For instance, the cap 112 can be coupled to the opened end 104 of the tubular body 102 by rotating the cap 112 such that at least a portion of the threaded internal surface 116 engages at least a portion of the threaded external surface 118 on the tubular body 102. Rotation can be carried out until the cap 112 is snugly fit to the tubular body 102, for instance, until the bottom surface 114 of the cap 112 abuts the lip 110 of the tubular body 102 or abuts a seal disposed between the lip 110 and the bottom surface 114 of the cap 112. FIG. 3B illustrates the exemplary vial 100 that is sealed by the cap 112 after step 204.

Figure 3C:
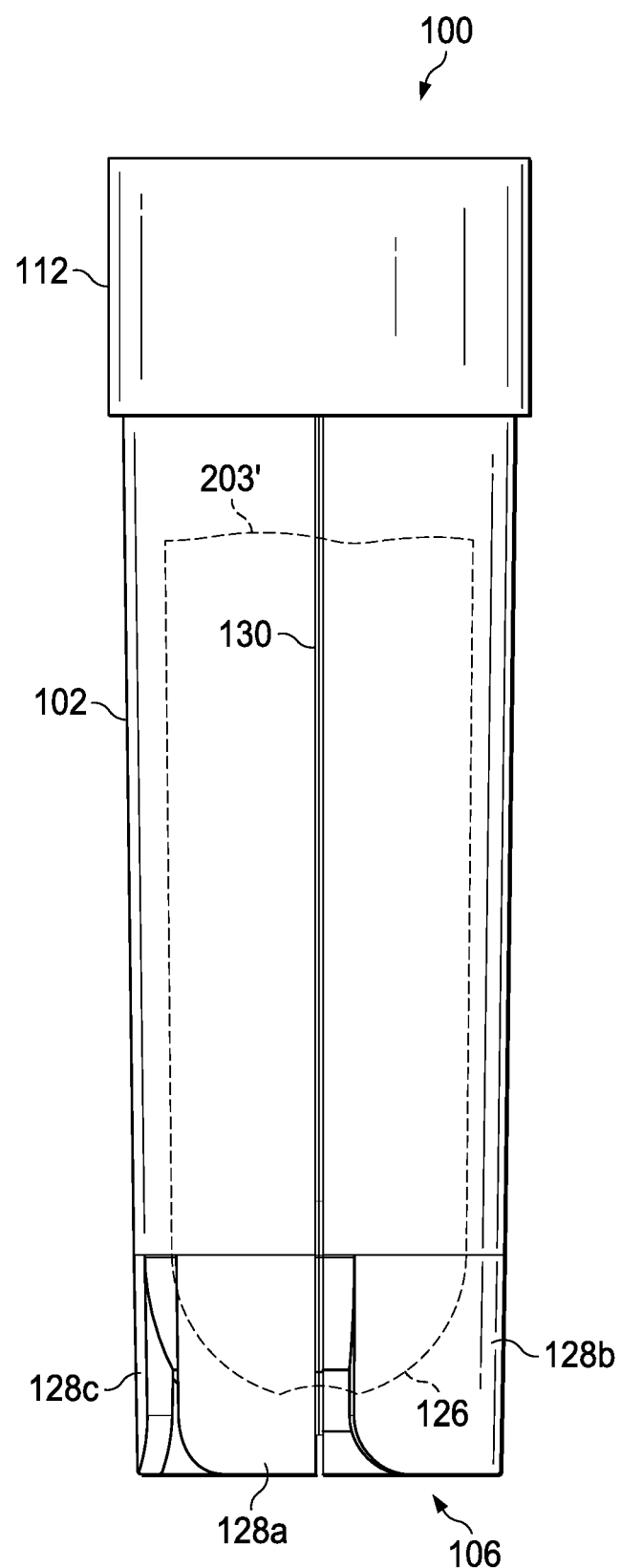

At step 206, the liquid sample 203 is frozen e.g., at a temperature below the freezing point of the sample 203, within the sealed vial 100. For instance, the vial 100 can be frozen in an upright position such that the sample 203 is in contact with the rounded bottom 126 of the closed end 106 of the tubular body 102. FIG. 3C illustrates the exemplary sealed vial 100 that contains the frozen liquid sample 203' after step 206.

Figure 3D:
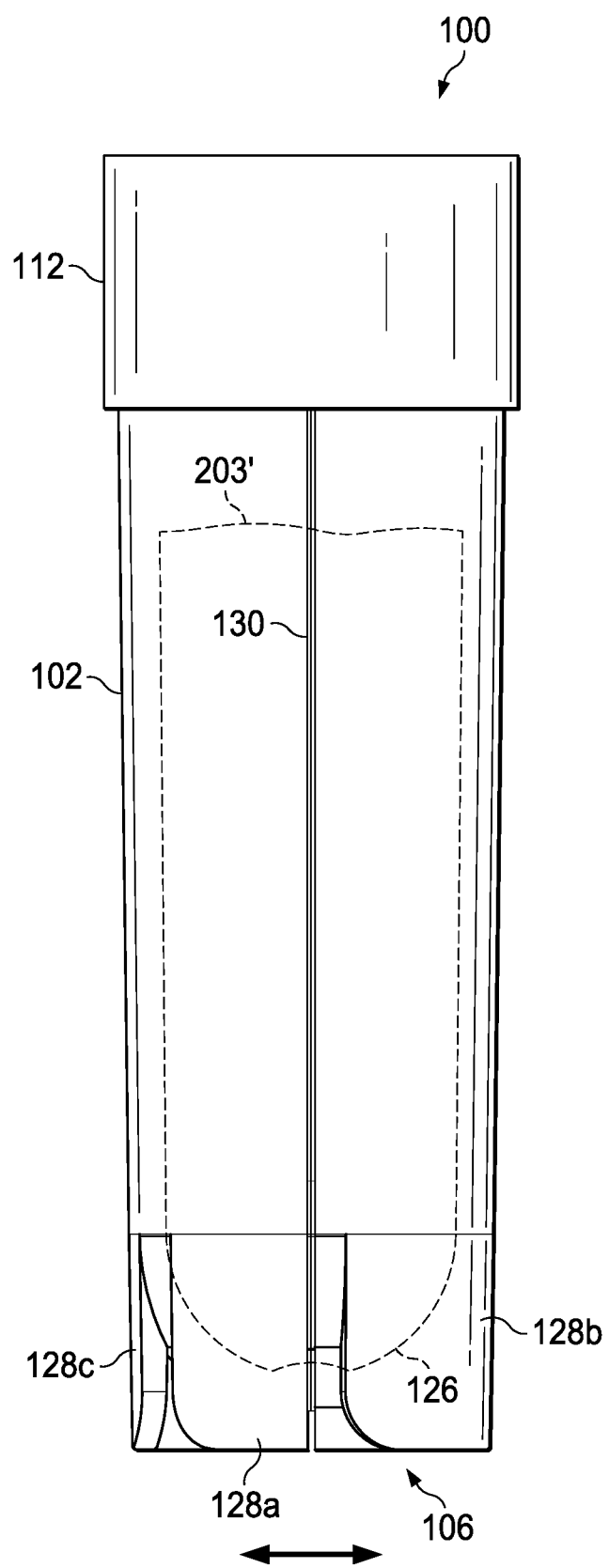
Figure 3E:
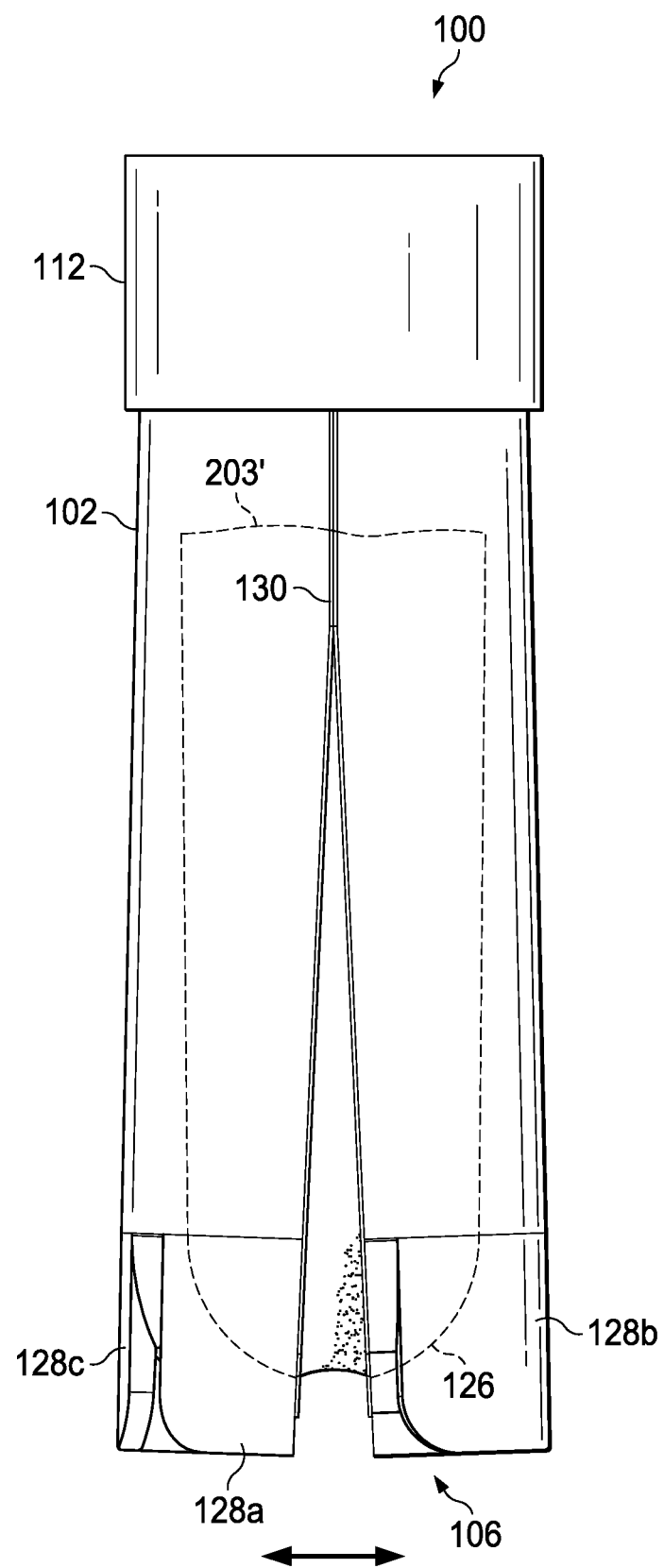
Figure 3F:
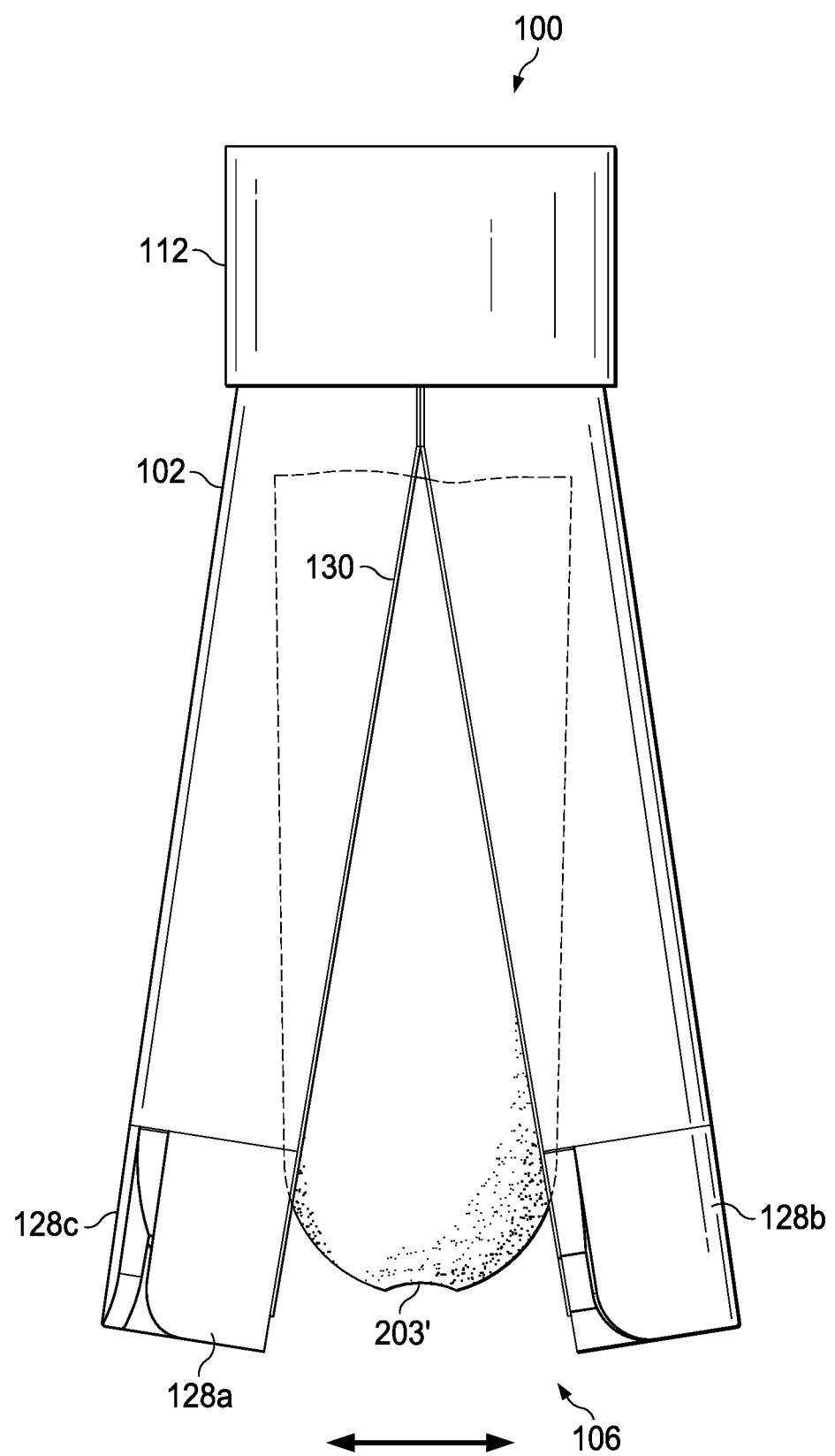

At step 208, the two flanges 128a and 128b (for example) are separated from one another outwardly from the tubular body 102 to apply a force to break apart at least a portion of the tear line 130 to open at least the closed end 106 and if desired at least a portion of the sides of the tubular body 102 of the tubular body 102. In one embodiment, an end user would remove the vial 100 from the cryopreservation freezer and then would grip the two flanges 128*a* and 128*b* and apply a force to break apart at least a portion of the tear line 130 to open the closed end 106 and if desired at least a portion of the sides of the tubular body 102. For example, a person could break the tear line to pull the flanges apart, or a person could pinch the flanges to break the tear line 130. FIGS. 3D-3F illustrates the exemplary sealed vial 100 at various stages while the two flanges 128*a* and 128*b* (for example) are separated from one another outwardly from the tubular body 102 to apply a force to break apart at least a portion of the tear line 130 to open the closed end 106 and a portion of the sides of the tubular body 102 which contains the frozen liquid sample 203' pursuant to step 208.

Figure 3G:
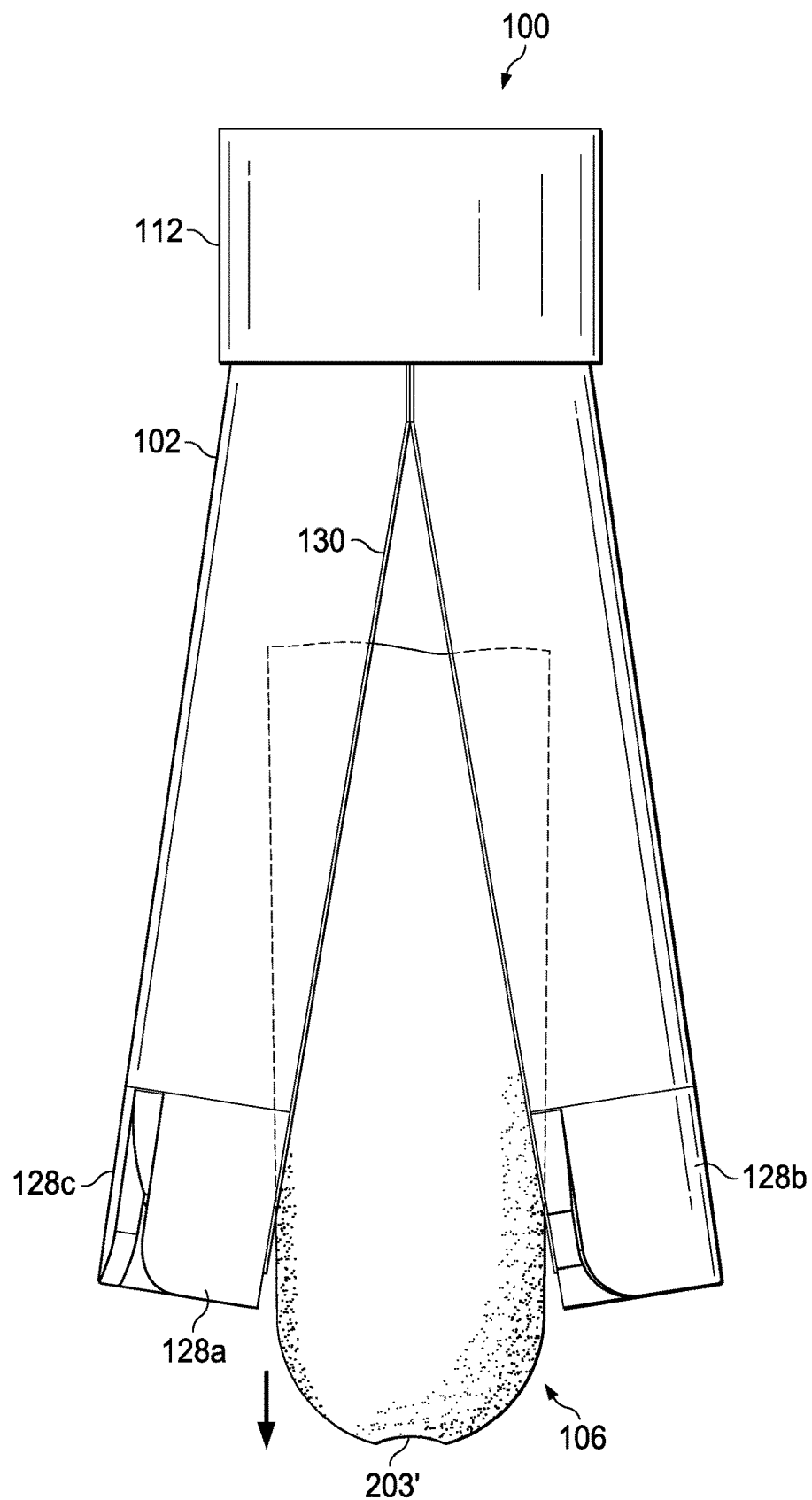

At step 210, the frozen liquid sample 203's is ejected from the now opened closed end 106 of the tubular body 102. If needed, a person can pull or use some device to grab and pull the frozen liquid sample 203' from the vial 100. The pulling or grabbing of the frozen liquid sample 203' would likely not be needed and in fact is not desired since it could damage the sample. Further, the vial 100 would only need to be opened far enough in step 208 in order to allow the frozen liquid sample 203' to drop into a collection vessel. FIG. 3G illustrates the exemplary sealed vial 100 that has a now opened closed end 106 and the frozen liquid sample 203' being ejected therefrom pursuant to step 210.

Figure 4:
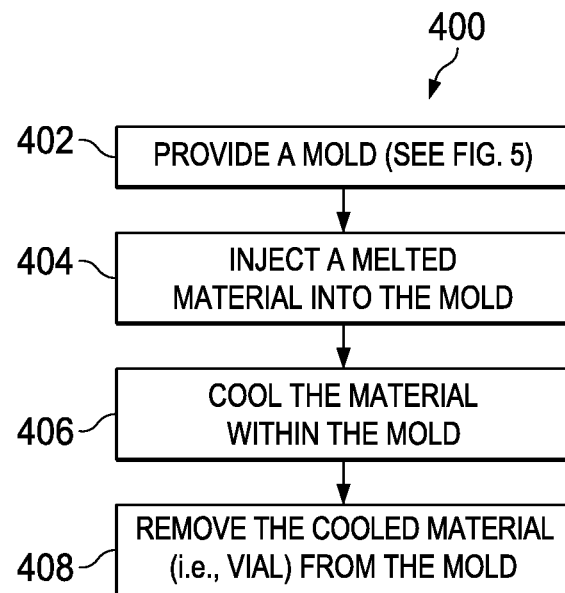
FIG. 4 is a flowchart illustrating the basic steps of a method for manufacturing the vial (e.g., cryopreservation vial) in accordance with an embodiment of the present disclosure.
Figure 5:
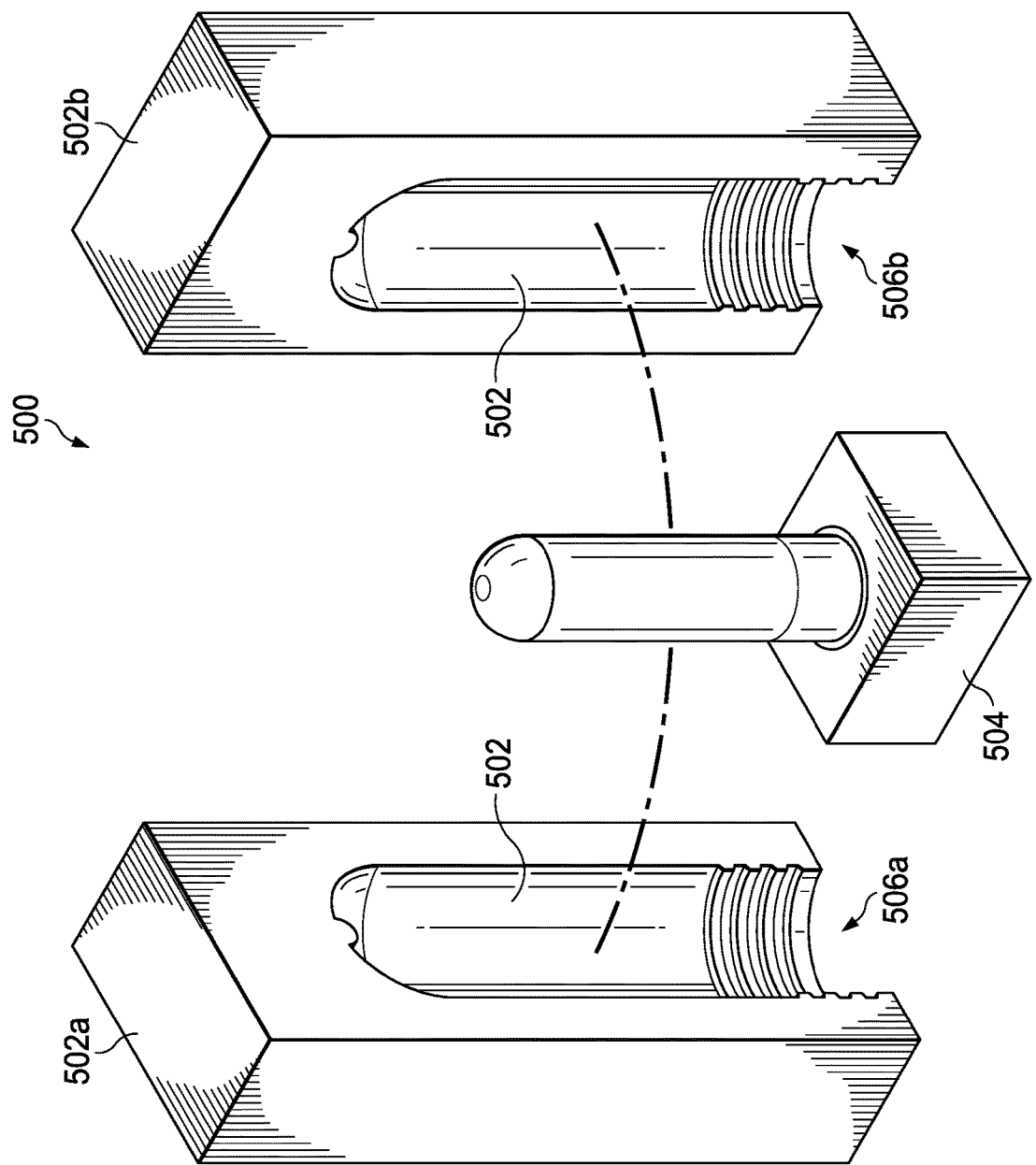
FIG. 5 illustrates a mold that can be used to manufacture a vial (e.g., cryopreservation vial) pursuant to the method shown in FIG. 4 in accordance with an embodiment of the present disclosure.

Referring to FIG. 4, there is a flowchart illustrating the basic steps of a method 400 for manufacturing the vial 100 in accordance with an embodiment of the present disclosure. Beginning at step 402, a mold 500 is provided that comprises a cavity section 502 therein that is a negative of a shape of the vial 100 (see FIGS. 1A-1D). FIG. 5 illustrates an exemplary mold 500 that that comprises a cavity section 502 therein that is a negative of a shape of the vial 100. In this example, the mold 500 is made from two cavity cross sections 502*a* and 502*b* and a core pin 504. The two cavity cross sections 502*a* and 502*b* have cavities 506*a* and 506*b* that together form a negative of the shape of the vial 100. The core pin 504 is used to create the cavity 108 of the vial 100. The mold 500 is formed when the two cavity cross sections 502*a* and 502*b* are located adjacent to one another and the core pin 504 is located inside the cavity sections 506*a* and 506*b* of the two connected cavity cross sections 502*a* and 502*b*. In embodiments, the mold may have a thin projection, such as a rib, in the mold that forms a tear line (not shown). In embodiments, the thin projection may be continuous or discontinuous (so as to form a discontinuous or perforated tear line). Or, the tear line may be formed at the seam when the two halves of the mold are placed together. At step 404, a melted material (e.g., melted plastic) is injected into the cavity 502 of the mold 500. At step 406, the material (e.g., melted plastic) is cooled within the cavity 502 of the mold 500. At step 408, the cooled material (e.g., plastic) is removed from the mold 500, where the cooled material is the vial 100 (see FIGS. 1A-1D). In an alternative embodiment, a liquid material, or multiple liquid materials could be introduced into the mold. For example, two liquid materials that when brought together harden in the mold could be used. In this embodiment, no cooling step (408) would be necessary.

Figure 6:
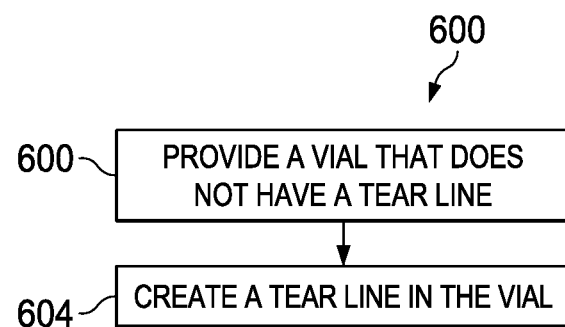
FIG. 6 is a flowchart illustrating the basic steps of a method for manufacturing the vial (e.g., cryopreservation vial) in accordance with another embodiment of the present disclosure.

Referring to FIG. 6, there is a flowchart illustrating the basic steps of a method for manufacturing the vial 100 in accordance with another embodiment of the present disclosure. At step 602, a vial 100 (without a tear line 130) is provided which comprises: (i) a tubular body 102 comprising a cavity 108, an opened end 104, and a closed end 106, wherein the opened end 104 is located at one end of the tubular body 102 and the closed end 106 is located at an opposing end of the tubular body 102; and (ii) the tubular body 102 further comprises two flanges 128*a* and 128*b* extending from the closed end 106. At step 604, create the tear line 130 within the vial 100 such that the tear line 130 would continually extend across at least a portion of one side of the tubular body 102, across the closed end 106, and across at least a portion of another side of the tubular body 102. In one embodiment, an automated cutting tool would be used to create the tear line 130 in the vial 100. In other embodiments, any material removing device such as for example a machining device, a hot knife, or a die cutting device could be used to create the tear line 130 in the vial 100.

The vial 100, including the tubular body 102 and the cap 112 thereof, can be manufactured from any material suitable for cryopreservation applications. Non-limiting exemplary materials can include, for example, plastics such as polyolefins synthetic and thermoplastic polymers, such as polypropylene, polyethylene, polystyrene, polyester, polycarbonate, and polytetrafluoroethylene, to name a few. According to various embodiments, the tubular body 102 and cap 112 of the vial 100 can comprise the same or different materials. Additionally, the cap 112 may comprise a substantially rigid material, whereas the tubular body 102 can comprise a rigid or flexible material. In certain embodiments, the tubular body 102 can comprise a material which, at a sufficiently high thickness can provide rigidity at the opened end 104, but at a sufficiently low thickness can provide flexibility at the closed end 106. For example, according to various embodiments, the thickness of the wall of the tubular body 102 proximate the opened end 104 can range from about 0.05 cm to about 0.2 cm, such as from about 0.06 cm to about 0.15 cm, or from about 0.075 cm to about 0.125 cm, including all ranges and sub-ranges therebetween, whereas the thickness of the wall of the tubular body 102 proximate the closed end 106 can range from about 0.025 cm to about 0.1 cm, such as from about 0.03 cm to about 0.075 cm, from about 0.04 cm to about 0.07 cm, or from about 0.05 cm to about 0.06 cm, including all ranges and sub-ranges there between.

In view of the foregoing, a vial 100 has been described herein that has a tubular body 102 which comprises an opened end 104, a closed end 106, and a cavity 108, wherein the opened end 104 is located at one end of the tubular body 102 and the closed end 106 is located at an opposing end of the tubular body 102. The tubular body 102 further comprises a tear line 130 located therein, wherein the tear line 130 begins on one side of the tubular body below the opened end 104 and extends over the closed end 106 and further extends on an another side of the tubular body to below the opened end 104. In addition, the tubular body 102 comprises two flanges 128*a* and 128*b* (or more flanges) extending from the closed end 106, wherein the two flanges 128*a* and 128*b* are configured to separate from one another outwardly from the tubular body 102 and apply a force to break-open at least a portion of the tear line 130 to open at least the closed end 106 and if desired a portion of two sides of the tubular body 102.

The following is a discussion about some additional technical features and various advantages associated with the vial 100 of the present disclosure. The vial 100 has a designed in feature or molded imperfection referred to herein as the tear line 130. The vial 100 can be molded using injection molding methods. The localized tear line 130 (e.g., thin section 130) can bisect the vial 100 vertically up to the base of the threads 118. The chain alignment from injection molding promotes the separation of the vial 100. The chains will be aligned in the flow direction. Note: chain alignment refers to the polymer chains. When the polymer is melted and the process is above one or both of the glass transition temperature and the melt temperature then the long polymer chains separate. These separate chains in the molten form will align under pressure while the material is being injected into the mold cavity. The thin section (tear line 130) that bisects the molded vial vertically will be parallel to the polymer flow. The material used to manufacture the vial 100 could be Profax Polypropylene PF 511.

The vial 100 has a tear line 130 that enables the propagation of the break to occur from the closed end 106 and up the sides of the tubular body 102 (note: the tear line 130 if desired can be positioned to enable the propagation of the break to occur in a different place other than across the closed end 106 on the tubular body 102). The cap 112 could remain on the vial 100 during and after the breaking of the tear line 130, which would enable the vial 100 to stay together for easier disposal, eliminate the need for cap 112 removal, and mitigate the sample from being near any contamination or needing any handling near the opened end 104 of the tubular body 102.

The design and manufacturing of the vial 100 can employ molding methods, unique processed material behavior, and 'design for failure' techniques. For instance, one design uses the existing tube foot-print (e.g., mold) and materials, but leverages a new design technique in order to create the tear line 130 and enable a breakaway or tearing open of the vial 100 under the right force allowing for pellet ejection without thawing The vial 100 assists in mitigating the contamination risk of the sample and can eliminate process steps namely the removal of the cap to eject the sample.

The following TABLE 1 illustrates the value of the new vial 100 relative to a similar shaped vial that does not have the tear line 130 formed therein (referred to as a traditional vial without tear line).

TABLE 1

|  | Traditional Vial without Tear Line | New Vial with Tear Line |
|---|---|---|
| Extreme Temperature Stability | = | = |
| Cap Creates Hermetic Seal | = | = |
| Ejectable Pellet/Sample (note 1) | − | ++ |
| Sterile/Gamma Stable | = | = |
| Compatible with Dimensions of Existing Boxes/Racks | = | = |
| Ease of Use (note 2) | − | +++ |
| Number of Process Steps | = | = |
| Throughput | = | = |
| Resin Usage | = | ++ |
| Cost (note 3) | = | +++ |

Note 1:
Ejecting the frozen pellet is a large benefit to the end user of the vial 100 due to the elimination of process steps (e.g., removal of the cap) and reduction of contamination risks.
Note 2:
The traditional vial as discussed in the background section is labor intensive to use and has inherent contamination risks due to handling. In contrast, the new vial 100 removes the process step of removing the cap and does not require any additional tools to release the pellet.
Note 3:
The new vial 100 can be made in the same manner as the traditional vial by using the same processes, same equipment albeit with a different mold which enables the formation of the tear line 130 while potentially enabling a reduction in resin consumption due to the presence of the tear line 130.

The vial 100 has improved product performance and value added features for end users such as: (a) fewer process steps for thawing cryopreserved cells which saves end user's time; (b) an Increase in cell yield which makes the vial more productive for cell growth; (c) no centrifugation which reduces changes to damage sample; (d) dilution of toxic materials (e.g., DMSO) to reduce risk of toxicity; (e) reduction of contamination which results in less handling of vial 100 and the elimination of thawing in non-sterile water bath; (f) the vial 100 can be made from same material used to make the traditional vial with no tear line so that no additional material qualification or testing is required and there is no need for complicated processing techniques, such as two-shot molding; (g) lower tooling cost with only slight tooling modifications required and a new insert set for design changes each to add the tear line 130, and ability to run in current location with same presses and automation used to make traditional vial; and (h) opportunity for part thinning which leads to material consumption reduction, lower material cost and lower processing energy consumption due to the tear line 130 and which also would aid in 'break away' performance—the thinner the tear line 130 the easier to 'break away' and open the vial 100.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "an opening" includes examples having two or more such "openings" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All numerical values expressed herein are to be interpreted as including "about," whether or not so stated, unless expressly indicated otherwise. It is further understood, however, that each numerical value recited is precisely contemplated as well, regardless of whether it is expressed as "about" that value. Thus, "a dimension less than 10 mm" and "a dimension less than about 10 mm" both include embodiments of "a dimension less than about 10 mm" as well as "a dimension less than 10 mm."

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a method comprising A+B+C include embodiments where a method consists of A+B+C, and embodiments where a method consists essentially of A+B+C.

Although multiple embodiments of the present disclosure have been illustrated in the accompanying Drawings and described in the foregoing Detailed Description, it should be understood that the disclosure is not limited to the disclosed embodiments, but is capable of numerous rearrangements, modifications and substitutions without departing from the disclosure as set forth and defined by the following claims.

What is claimed is:

1. A method for using a vial, the method comprising the steps of:
   introducing a liquid sample into the vial, the vial comprising:
      a tubular body comprising an opened end, a closed end, and a cavity, wherein the opened end is located at one end of the tubular body and the closed end is located at an opposing end of the tubular body;
      the tubular body further comprises a tear line located therein, wherein the tear line extends across at least a portion of one side of the tubular body, across the closed end, and across at least a portion of another side of the tubular body; and
      the tubular body further comprises two flanges extending from the closed end;
   engaging the opened end of the tubular body with a cap to seal the vial;
   freezing the liquid sample within the sealed vial;
   separating the two flanges from one another outwardly from the tubular body to apply a force to break apart at least a portion of the tear line to open at least the closed end of the tubular body; and
   ejecting the frozen liquid sample from the now opened closed end of the tubular body.

2. The method of claim 1, wherein the tear line extends from below a threaded portion of the tubular body across the one side of the tubular body, across the closed end, and across the another side of the tubular body to below the threaded portion of the tubular body.

3. The method of claim 1, wherein the tear line extends from a threaded portion of the tubular body across the one side of the tubular body, across the closed end, and across the another side of the tubular body and into the threaded portion of the tubular body.

4. The method of claim 1, wherein the tear line bisects the tubular body.

5. The method of claim 1, wherein the tear line is a localized thin section within the tubular body.

6. The method of claim 1, wherein the tubular body further comprises one or more additional tear lines located therein and at least two more flanges two flanges extending from the closed end.

* * * * *

UNITED STATES PATENT AND TRADEMARK OFFICE
CERTIFICATE OF CORRECTION

PATENT NO.       : 11,013,230 B2
APPLICATION NO.  : 16/832280
DATED            : May 25, 2021
INVENTOR(S)      : Michael Kurt Schaefer Page 1 of 1

It is certified that error appears in the above-identified patent and that said Letters Patent is hereby corrected as shown below:

On the Title Page

Column 2, item [56], Line 3, delete "Catalong," and insert -- Catalog, --, therefor.

In the Claims

Claim 6 Column 12, Line 26, delete "at least two more flanges two flanges" and insert -- at least two more flanges --, therefor.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*